United States Patent
Hirano et al.

(10) Patent No.: US 8,167,286 B2
(45) Date of Patent: May 1, 2012

(54) CYLINDRICAL VIBRATION ISOLATING DEVICE

(75) Inventors: Yukinobu Hirano, Fujimino (JP); Hironao Nishimae, Fujimino (JP)

(73) Assignee: Yamashita Rubber Kabushiki Kaisha, Fujimino-shi (JP)

( * ) Notice: Subject to any disclaimer, the term of this patent is extended or adjusted under 35 U.S.C. 154(b) by 746 days.

(21) Appl. No.: 12/103,853

(22) Filed: Apr. 16, 2008

(65) Prior Publication Data

US 2008/0258364 A1 Oct. 23, 2008

(30) Foreign Application Priority Data

Apr. 17, 2007 (JP) .................... 2007-108735

(51) Int. Cl.
  *B60G 11/22* (2006.01)
  *F16F 1/44* (2006.01)
(52) U.S. Cl. ............... 267/293; 267/141.2; 188/379
(58) Field of Classification Search .......... 267/136, 267/140.11, 140.12, 141.2, 292, 293, 294; 188/379, 380
See application file for complete search history.

(56) References Cited

U.S. PATENT DOCUMENTS

| | | | | |
|---|---|---|---|---|
| 4,936,557 A * | 6/1990 | Schwerdt | ............. | 267/141.2 |
| 5,814,963 A * | 9/1998 | Girard et al. | ............. | 318/611 |
| 6,585,222 B2 * | 7/2003 | Ihara et al. | ............. | 248/562 |
| 6,641,119 B2 * | 11/2003 | Kato | ............. | 267/140.12 |
| 7,267,740 B2 * | 9/2007 | Yasumoto et al. | ............. | 156/294 |
| 2001/0052663 A1 * | 12/2001 | Katagiri | ............. | 267/140.11 |
| 2002/0101013 A1 * | 8/2002 | Kato | ............. | 267/140.11 |
| 2002/0185797 A1 * | 12/2002 | Someya et al. | ............. | 267/140.11 |
| 2005/0253317 A1 * | 11/2005 | Yasumoto et al. | ............. | 267/140.11 |
| 2008/0018032 A1 * | 1/2008 | Yasumoto et al. | ............. | 267/141.2 |
| 2008/0196987 A1 * | 8/2008 | Niwa | ............. | 188/379 |

FOREIGN PATENT DOCUMENTS

JP  3-117137  12/1991

* cited by examiner

Primary Examiner — Bradley King
Assistant Examiner — Nicholas J Lane
(74) Attorney, Agent, or Firm — Rankin, Hill & Clark LLP

(57) ABSTRACT

A cylindrical vibration isolating device having an inner cylinder, an outer cylinder surrounding the inner cylinder, an elastic leg having a pair of right and left leg portions to connect the inner cylinder and the outer cylinder and, when viewed in the axial direction of the inner cylinder, being formed in a substantially inverted V-shape while placing the inner cylinder in an intermediate position, and a mass projection being provided in the elastic leg such that the mass projection resonates in a frequency range that the elastic leg causes bending resonance. The mass projection is provided outside of an inner restraint line that is a perpendicular line passing an outermost point of an inner restrained portion that is a connected portion between the inner cylinder and the elastic leg.

5 Claims, 11 Drawing Sheets

CYLINDRICAL VIBRATION ISOLATING DEVICE

BACKGROUND OF THE INVENTION

1. Field of the Invention

The present invention relates to a cylindrical vibration isolating device for use in an engine mount or the like which is provided with a projection on an elastic leg to suppress a surging phenomenon due to resonance of the projection, and particularly, to the device which has the improved durability of the projection.

2. Description of the Related Art

In a cylindrical vibration isolating device used for isolating the transmission to the vehicle body of the vibration generated in an engine or the like, there is known a cylindrical bushing that a mass projection functioning as a mass (mass portion) of a dynamic damper is provided on an elastic leg so as to suppress a surging phenomenon by the resonance of the mass projection (see Japanese utility model laid-open publication No. H03-117137). The surging phenomenon is a phenomenon developing a peak of a dynamic spring constant by deformation in the direction repellent to the direction of the vibration at the time of bending resonance of the elastic leg.

FIG. 10 shows the cylindrical bushing of the prior art as above, wherein an inner cylinder 120 and an outer cylinder 130 are arranged inwardly and outwardly, and a horizontal elastic leg 140 connects the inner cylinder 120 and the outer cylinder 130. The elastic leg 140 extends substantially horizontally from the inner cylinder rightward and leftward to be connected to the outer cylinder 130. A pair of mass projections 150 projects integrally from each lateral side of the elastic leg 140 so as to suppress the bending resonance by resonating at the time of the bending resonance of the elastic leg 140.

FIGS. 11a-11b are examples for reference a mass projection is provided in a cylindrical engine mount having an elastic leg of a substantially inverted V-shape. This engine mount 1 has an inner cylinder 2 and an outer cylinder arranged in and out, and these inner cylinder 2 and outer cylinder 3 are connected by the elastic leg 4. When viewed in the axial direction of the inner cylinder 2, the elastic leg 4 is formed in a substantially inverted V-shape or a substantially arch shape having a pair of right and left leg portions. On the lateral side of each of the elastic leg portions 4 there is formed an integrally projecting mass projection 5.

In the present invention, a front view is the one viewed in the axial direction of the inner cylinder in the cylindrical vibration isolating device such as the engine mount 1 or the like. Each of the directions in the present invention is based on an illustrated state in FIGS. 11a-11b (or FIG. 1 as explained hereunder) which is the front view, wherein the upward and downward direction and the right and left direction in the drawing denote the upward and downward direction and the right and left direction of the engine mount 1, respectively. The upward and downward direction corresponds to the inputted direction (the direction shown by arrow Z) of the principal vibration to be isolated, in a state of being mounted on the vehicle body, and also corresponds to the loading direction of a static load. In addition, the term "inside" denotes the direction toward the inner cylinder 2 in the front view (in a side view or the like viewed in the direction perpendicular to the axis, the direction toward a center of longitudinal direction of the inner cylinder along the axial direction thereof).

The elastic leg 4 is connected along and to the periphery of the inner cylinder 2 by vulcanized welding or the like, and the connected portion forms an inner restrained portion 6. A tangential line in the vertical direction passing a point 6a located in an outermost position of the inner restrained portion 6 denotes an inner restraint line L1. Similarly, the elastic leg 4 is connected by vulcanization or the like to the inner wall of the outer cylinder 3, and this connected portion forms an outer restrained portion 7. When the elastic leg 4 is connected in an arch shape to the inner cylinder 2 and the outer cylinder 3, the outer restrained portion 7 are crossing points between an extension line of an outer edge portion of the elastic leg 4, which makes a larger arch shaped portion (4a, 4b) or a linear portion (4e, 4f) on an intermediate portion of the arch shaped portion (4c, 4d) of the elastic leg 4, and the outer cylinder 3. The one located on an upper side of the outer restrained portion 7 is an upper outer restrained portion 7a while the one located on a lower side thereof is a lower outer restrained portion 7b.

A vertical line passing the lower outer restrained potion 7 denotes an outer parallel line L2. The reference character L3 denotes a tangential line passing the upper outer restrained portion 7a and connected to a point 6b of the outer periphery of the inner cylinder 2. The reference character L4 denotes a straight line parallel to the straight line L3 passing the lower outer restrained portion 7b. Also, a line connecting the upper outer restrained portion 7a and the lower outer restrained portion 7b denotes an outer restraint line L5. Further, the reference character L6 denotes a line parallel to the outer restraint line L5 and tangential to the outer periphery of the inner cylinder 2. A straight line extending parallel to the outer restraint line L5 and the parallel line L6 and provided in an intermediate position therebetween denotes an intermediate line L7. The straight line L3 is a tangential line connecting the upper outer restrained portion 7a and the contact point 6b of the outer periphery of the inner cylinder 2. The straight line L4 is a line passing the lower outer restrained portion 7b and extending parallel to the straight line L3.

The mass projection 5 is in a circular shape in a front view and is located on the inner restraint line L1 and the outer parallel line L2. Namely, the mass projection 5 is comparatively large and has a diameter greater than a space "d" between the inner restraint line L1 and the outer parallel line L2. It overlaps with the intermediate line L7, and at least a portion thereof is located inside of the intermediate line L7. Moreover, the mass projection 5 has a predetermined mass to function as a dynamic damper against the vibration of the elastic leg 4 and is set such that it develops resonance in a resonance frequency range of the elastic leg 4.

FIG. 4 is a graph showing dynamic characteristics against an excitation frequency. The curve shown in a phantom line denotes a dynamic spring constant curve of a comparative example without the mass projection 5. By the bending resonance of the elastic leg 4, it reaches a peak "a" of large dynamic spring constant in the vicinity of 900 Hz. At this peak "a" there is a decrease in vibration isolating effect.

A curve in a solid line denotes a dynamic spring constant curve of the example with the mass projection for reference as above and has peaks "b" and "c" of comparatively small dynamic spring constant in front of and behind the peak "a". The peak "b" is located for example around 750 Hz while the peak "c" is located for example in the vicinity of 1000 Hz. Accordingly, by provision of the mass projection 5, the dynamic spring peak is decreased from "a" to "c" in a range of 700~1000 HZ corresponding to a frequency of gear noises of a transmission, so as to provide a noticeable improvement in the dynamic spring by the difference "Dc" whereby it is possible to absorb the vibration due to the gear noises.

Incidentally, in the prior art shown in FIG. 10, the elastic leg 140 is provided substantially horizontal and has a substantially horizontal twin beam shape each end of which is restrained by an inner restraint line L1 and an outer restraint line L5. Therefore, since the mass projection 150 is located in a center of a shear deformation region of comparatively long span, the strain against a base portion of the mass projection 150 is decreased in comparison with the strain by the compression deformation, even if the elastic leg 140 generates the bending vibration. Thus, the crack or the like does not occur around the mass projection 150 at the vibration frequency of generally requested level, so that it is possible to obtain the sufficient durability with respect to the mass projection 150.

In the meantime, when this mass projection is provided in the engine mount 1 having the elastic leg 4 of a substantially inverted V-shape as in the example for reference in FIG. 11a, there are cases where the crack or the like in the base portion of the mass projection 5 occurs at the comparatively small vibration frequency (the order of tens of thousands) of generally requested level thereby decreasing the durability, as shown in FIG. 11b. Therefore, it is practically difficult to automatically provide the mass projection 5 on the substantially inverted V-shaped elastic leg 4. It has become clear from the results of the research that the crack or the like is caused by overlapping of the mass projection 5 with each of the inner restraint line L1 and the outer parallel line L2, especially, with the inner restraint line L1 and by overlapping of the mass projection 5 with the intermediate line L7 so as to have the center of the projection located inside thereof.

Namely, it is generally thought that the mass projection 5 is arranged in the central area of the lateral side of the elastic leg 4 where there is a comparatively large free space for easy arrangement. However, the intermediate line L7 is located in the center of the lateral side, and the space "d" between the inner restraint line L1 and the outer parallel line L2 is small in the substantially inverted V-shaped elastic leg 4 so as to have these lines located comparatively close to each other. Therefore, when the mass projection 5 is arranged in the center of the elastic leg 4, it is easy to overlap with the inner restraint line L1, the outer parallel line L2 and the intermediate line L7. In addition, since the mass projection 5 having a greater diameter than the space "d" is provided, it is difficult to avoid overlapping with these restraint lines.

However, the inside of the inner restraint line L1 is a compression region A comprised mainly of compression and tension deformation, the area between the inner restraint line L1 and the outer parallel line L2 is a shear region B comprised mainly of shear deformation, and the outside of the outer parallel line L2 is a compression and shear region C where the compression deformation and the shear deformation are mixed. Then, the compression region A is the greatest spring constant region, the compression and shear region C is the second greatest spring constant region, and the shear region B is the smallest spring constant region. Accordingly, the greatest region in rubber leg deformation amount is the shear region B. Therefore, the region located on the inner restraint line L1 and the outer parallel line L2 is the region developing the greatest difference in the deformation amount so that when the mass projection 5 overlaps with these lines, the high strain is generated in the base portion of the mass projection 5. Then, as shown in FIG. 11b, which is a partial enlarged side view of the mass projection 5 of FIG. 11a, the crack 9 occurs in the base portion 8 of the mass projection 5 thereby decreasing the durability.

FIGS. 12a-b are views for explaining the vibration of the elastic leg 4 in the engine mount. FIG. 12a shows an upwardly moved state of the inner cylinder 2 and the elastic leg 4 is under tension by the pulling action of the inner cylinder 2. At that time, while the mass projection 5 is pulled by the inner cylinder 2 so as to move from a position shown in a phantom line to a position shown in a solid line, it is located between the inner restrained portion 6 and the outer restrained portion 7, so that the high strain due to the tension deformation is developed between the lower outer restrained portion 7b and the base portion 8 of the mass projection 5.

FIG. 12b shows a downwardly moved state of the inner cylinder 2 and the elastic leg 4 is compressed downward by the inner cylinder 2. At that time, since the mass projection 5 is pressed by the inner cylinder 2 so as to move from a position shown in a phantom line to a position shown in a solid line, the high strain is caused in the base portion of the mass projection 5 by the compression deformation between the inner cylinder 2 and the mass projection 5.

In the case where such upward and downward vibrations are continuously repeated, for example, in the case of having applied the vibrations which cause the upward displacement of 5.9 mm and the downward displacement of 11.5 mm, the crack occurred in the base portion 8 of the mass projection 5 at about twenty thousands of the vibration frequencies. Therefore, the present invention has its object to improve the durability by preventing the occurrence of such crack up to greater vibration frequencies.

SUMMARY OF THE INVENTION

To accomplish the above mentioned object, a cylindrical vibration isolating device according to the first aspect of the present invention comprises an inner cylinder, an outer cylinder surrounding the inner cylinder, an elastic leg having a pair of right and left leg portions to connect the inner cylinder and the outer cylinder and, when viewed in the axial direction of the inner cylinder, being formed in a substantially inverted V-shape while placing the inner cylinder in an intermediate position, and a mass projection provided in the elastic leg such that the mass projection resonates in a frequency range that the elastic leg causes bending resonance. The mass projection is provided outside of an inner restraint line that is a perpendicular line passing an outermost point of an inner restrained portion that is a connected portion between the inner cylinder and the elastic leg.

According to the second aspect of the present invention, a center of the mass projection is located outside of an intermediate line that is located in an intermediate position between an outer restraint line connecting an uppermost point and a lowermost point of an outer restrained portion that is a connected portion of the elastic leg with the outer cylinder and a tangential line to an outer periphery of the inner cylinder, extending parallel to the outer restraint line, and that extends parallel to each of the outer restraint line and the tangential line.

According to the third aspect of the present invention, at least half or more of a surface area of the mass projection is located outside of the intermediate line.

According to the fourth aspect of the present invention, the mass projection is arranged outside of the intermediate line and in an upper area of the elastic leg.

According to the fifth aspect of the present invention, the mass projection is provided in the vicinity of a cavity formed between an upper edge of the elastic leg and the outer cylinder.

According to the invention as defined in the first aspect, when the inner cylinder moves upward and downward by the vibration, since the mass projection is located outwardly off the inner restraint line, the excessive strain is not exerted on the mass projection, so that the occurrence of a crack in a base portion of the mass projection is prevented thereby to improve the durability.

According to the invention as defined in the second aspect, since the center of the mass projection is located outside of the intermediate line, it is possible to position the mass projection surely outwardly off the inner restraint line. Therefore, the sufficient improvement in durability is realized even in the engine mount having the substantially inverted V-shaped elastic leg, which is apt to cause the decrease in durability by occurrence of the crack in the base portion of the mass projection.

According to the invention as defined in the third aspect, since half or more of the surface area of the mass projection is located outside of the intermediate line, it is possible to avoid the direct influence by the inner restraint line.

According to the invention as defined in the fourth aspect, since the mass projection is arranged outside of the intermediate line and in the upper area of the elastic leg, the mass projection can be located in a preferred region for arrangement where there is the least strain.

According to the invention as defined in the fifth aspect, since the mass projection is provided in the vicinity of a cavity formed between an upper edge of the elastic leg and the outer cylinder, it is possible to let the strain exerted on the periphery of the mass projection escape by the deformation of the elastic leg toward the cavity, so that the mass projection can be located in a preferred arrangement region of the least strain.

BRIEF DESCRIPTION OF THE DRAWINGS

FIG. 11b is an enlarged cross sectional view taken along line 11b-11b of FIG. 11a.

DETAILED DESCRIPTION OF THE PREFERRED EMBODIMENT

Figure 1:
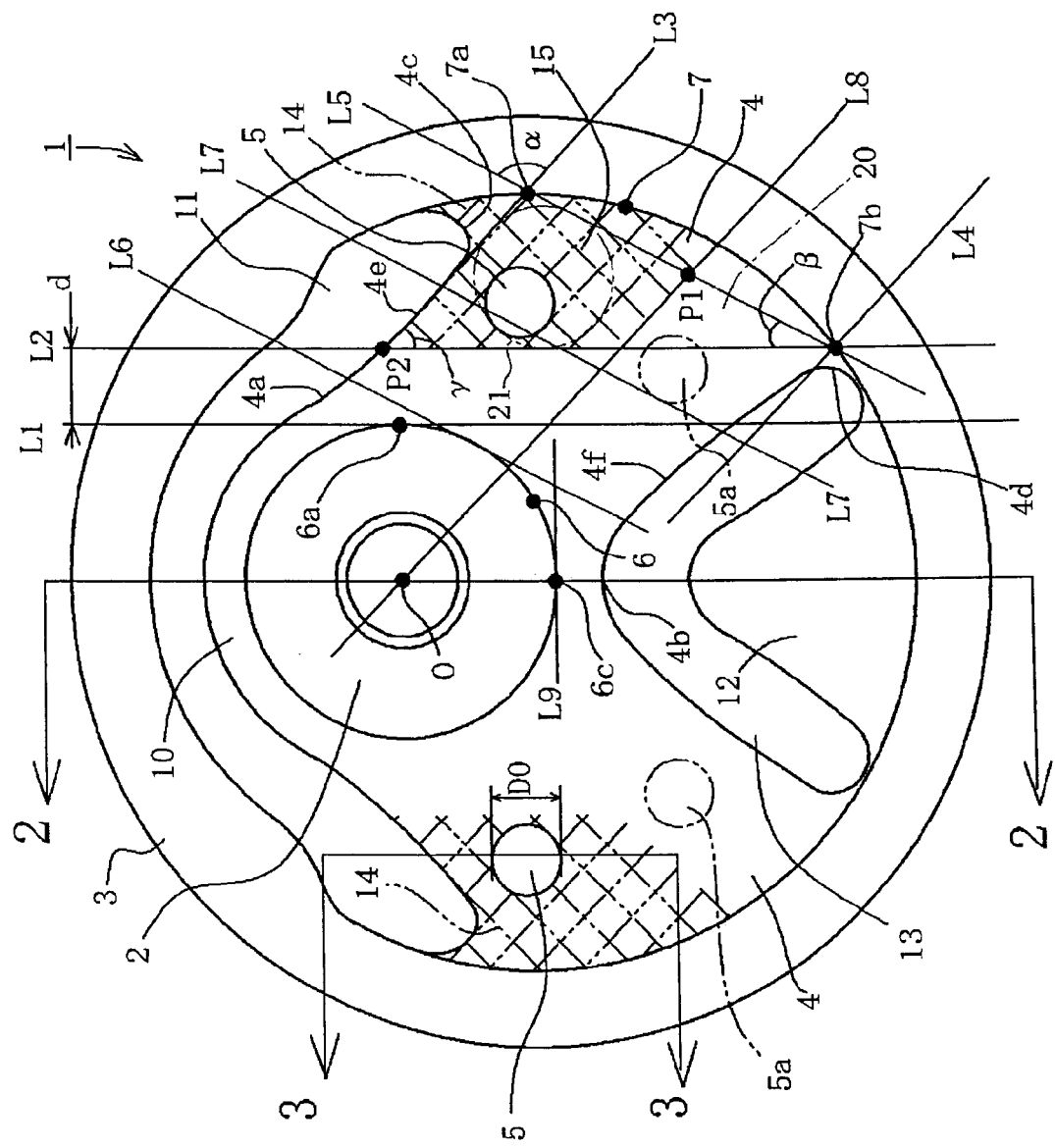
FIG. 1 is a front view of an engine mount according to the embodiment of the present invention.

Hereinafter, an embodiment of the present invention will be explained with reference to the accompanying drawings. In this embodiment only a mass projection is modified in comparison with the engine mount of the above described example for reference. Therefore, the explanation made in the above example for reference is applied correspondingly to the following explanation, and there may be omitted repeated explanation. Also, like or corresponding elements are given like reference characters used in the example for reference.

Figure 2:
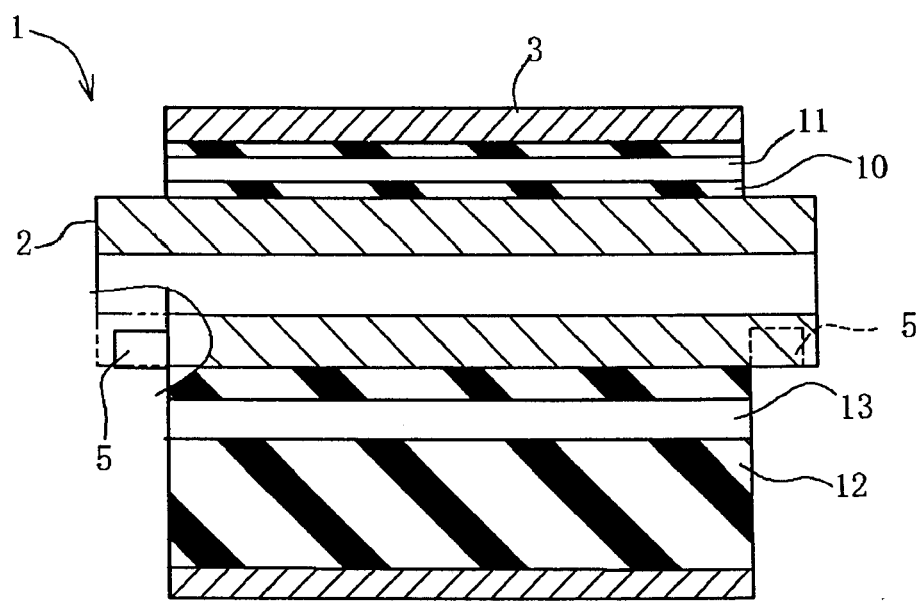
FIG. 2 is a cross sectional view taken along line 2-2 of FIG. 1.

FIG. 1 is a front view of an engine mount 1 formed as a vibration isolating device for supporting an engine, and FIG. 2 is a cross sectional view taken along line 2-2 of FIG. 1. The engine mount 1 is shown as an example of a cylindrical vibration isolating device. An elastic leg 4 is made of known elastic vibration isolating materials such as rubber and is formed in a substantially inverted V-shape or a substantially arch shape having a pair of right and left legs, in a front view.

On a lateral wall of each of the right and left elastic legs 4 there is integrally projected a mass projection 5. This mass projection 5 is formed in a comparatively small circle having a diameter D smaller than a space "d" between an inner restraint line L1 and an outer parallel line L2 and is located on the upper region of the elastic leg 4 outside of the outer parallel line L2 and an intermediate line L7 in the vicinity of an end 14 in the right and left direction of an upper cavity 11 and in the vicinity of an upper outer restrained portion 7a. Incidentally, the mass projection 5 is not necessarily in a circular shape and may be formed in a non-circular shape such as an angular shape. The above dimension D in the case of angular shape is to be measured not by a diameter but a lateral width in a horizontal direction. This mass projection 5 is provided on both side walls of the elastic leg 4 (see FIG. 2) and arranged symmetrically on each of the right and left elastic legs 4 in the same side wall thereof.

An outer restraint line L5 and a straight line L6 are to indicate the width direction of the elastic leg 4. The width of the outer end of the elastic leg 4 is a line length between the upper outer restrained portion 7a and a lower outer restrained portion 7b. A straight line 8 connecting a center O of an inner cylinder 2 and an intermediate point P1 of the outer restraint line L5 is provided so as to be a straight line of ½ width. Moreover, a horizontal line passing a point 6c of a lower end of outer periphery of the inner cylinder 2 is a tangential line L9.

In the present invention, with respect to the location of the mass projection 5, the side of the outer cylinder 3 across the intermediate line L7 denotes an outside or outer area, while the side of the inner cylinder 2 on the other side denotes an inside or inner area. In addition, the upper side across the straight line of ½ width L8 denotes an upper area in the width direction, while the lower side denotes a lower area.

Therefore, the mass projection 5 in this embodiment is being located on the outside and in the upper area and arranged in the upper area in the width direction within the compression and shear region C located outside of the outer parallel line L2. More precisely, the mass projection 5 is located above the tangential line L9 and adjacent to the end 14 of the cavity 11. This location is inside of an inscribed circle 21 of a triangle 20 connecting the upper outer restrained portion 7a, the lower outer restrained portion 7b and an intersection point P2 between the straight line L3 and the outer parallel line L2.

Figure 9:
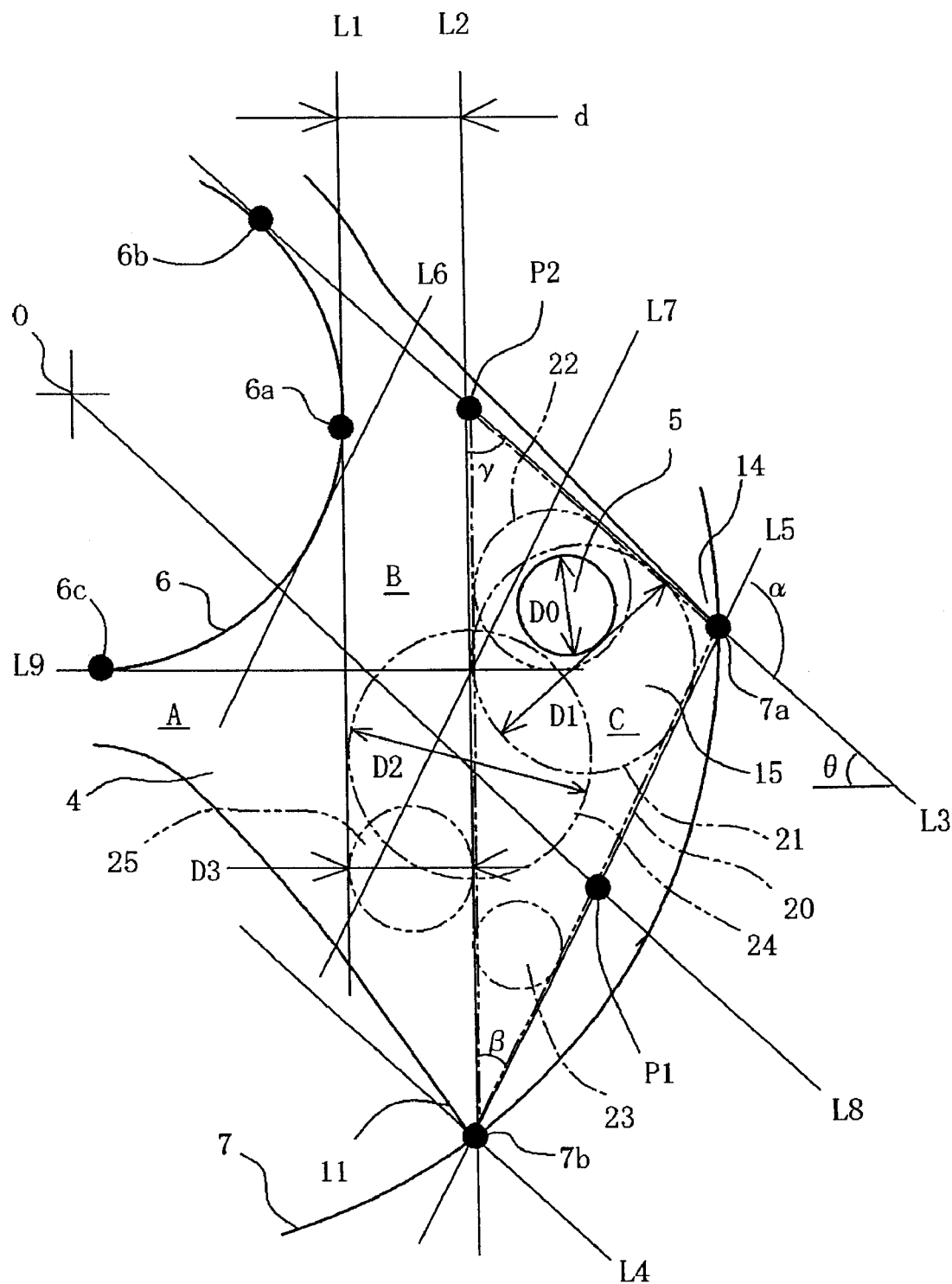
FIG. 9 is an explanatory view showing variations in arrangement or the like of the mass projection.
Figure 10:
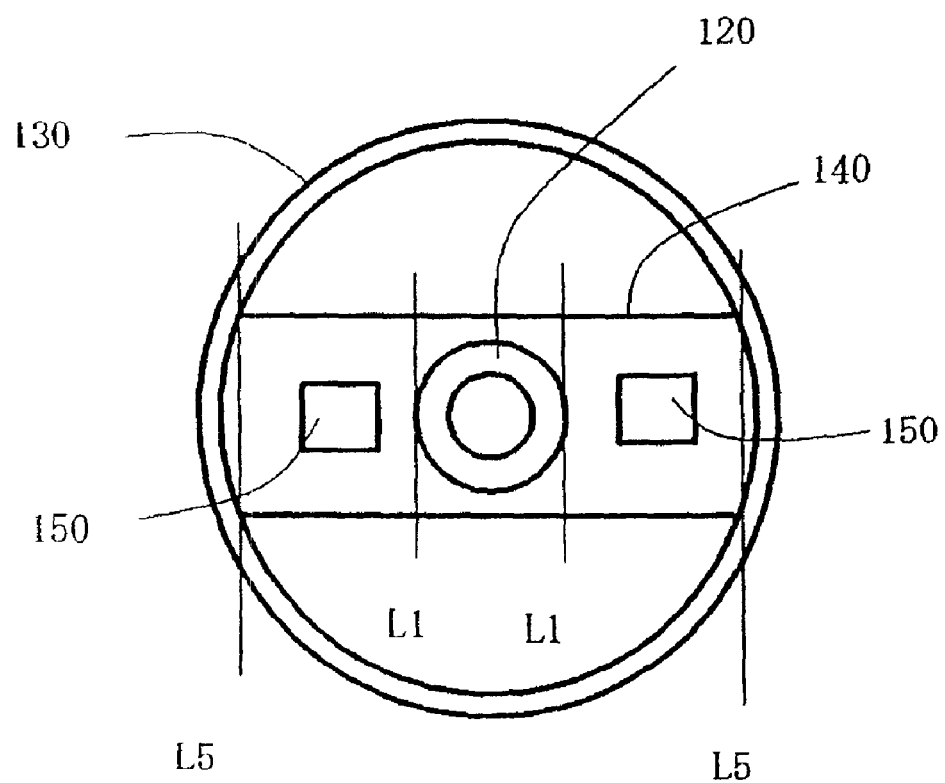
FIG. 10 is a front view of the prior art.

In FIG. 9, an angle α in the upper outer restrained portion 7a among apexes of the triangle 20 is an obtuse angle while each of angles β and γ at other apexes 7b and P2 is an acute angle, respectively. Also, an angle θ that the straight line L3 forms with a horizontal line is about 30~60 degrees and around approximately 45 degrees. Therefore, a distance between the outer parallel line L2 and the outer restraint line L5 becomes larger as the location goes upward within the triangle 20, while it becomes smaller as the location goes downward.

In FIG. 1 and FIG. 2, on the inner cylinder 2 an upper stopper 10 is protruded toward an inner wall of the outer cylinder 3. The upper cavity 11 is provided between the upper stopper 10, the elastic leg 4 and the inner wall of the outer cylinder 3 so as to pass through the elastic leg 4 in the axial direction. However, each of the cavities may be formed in the shape of a blind alley extending inwardly in the axial direction of the elastic leg 4 without passing therethrough.

Below the inner cylinder 2, also a lower stopper 12 is provided so as to protruded upward substantially in the shape of an inverted V-shape from the inner wall of the outer cylinder 3, and a lower cavity 13 is formed between the elastic leg 4 and the lower stopper 10. Similar to the upper cavity 11, the lower cavity 13 is formed to pass through the elastic leg 4 in the axial direction (see FIG. 2). The elastic leg 4 is able to be deformed to come into the upper cavity 11 and the lower cavity 13 in accordance with the upward and downward movement of the inner cylinder 2. The reference character 15 denotes a preferred arrangement region suitable for arrangement of the mass projection 5. In the broad sense, it is a region surrounded by the outer parallel line L2, the straight line of ½ width L8 and the outer cylinder 3, while in the narrow sense, it is a region surrounded by the intermediate line L8, the straight line of ½ width L8 and the outer cylinder 3. The inscribed circle 21 as above is included in the region in the broad sense. The mass projection 5 overlaps with the intermediate line L8 and the center thereof is located outside of the intermediate line L8 in such a manner that the greater part of the surface area is located within the preferred arrangement region 15 in the narrow sense.

Figure 3:
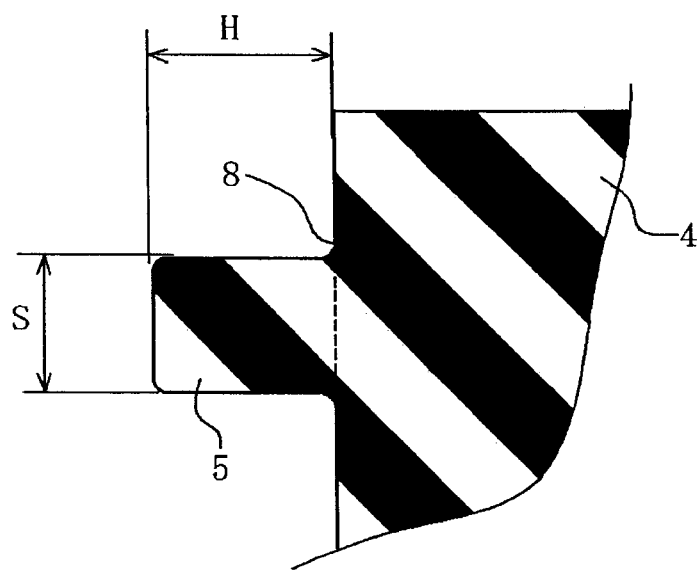
FIG. 3 is an enlarged cross sectional view taken along line 3-3 of FIG. 1.
Figure 4:
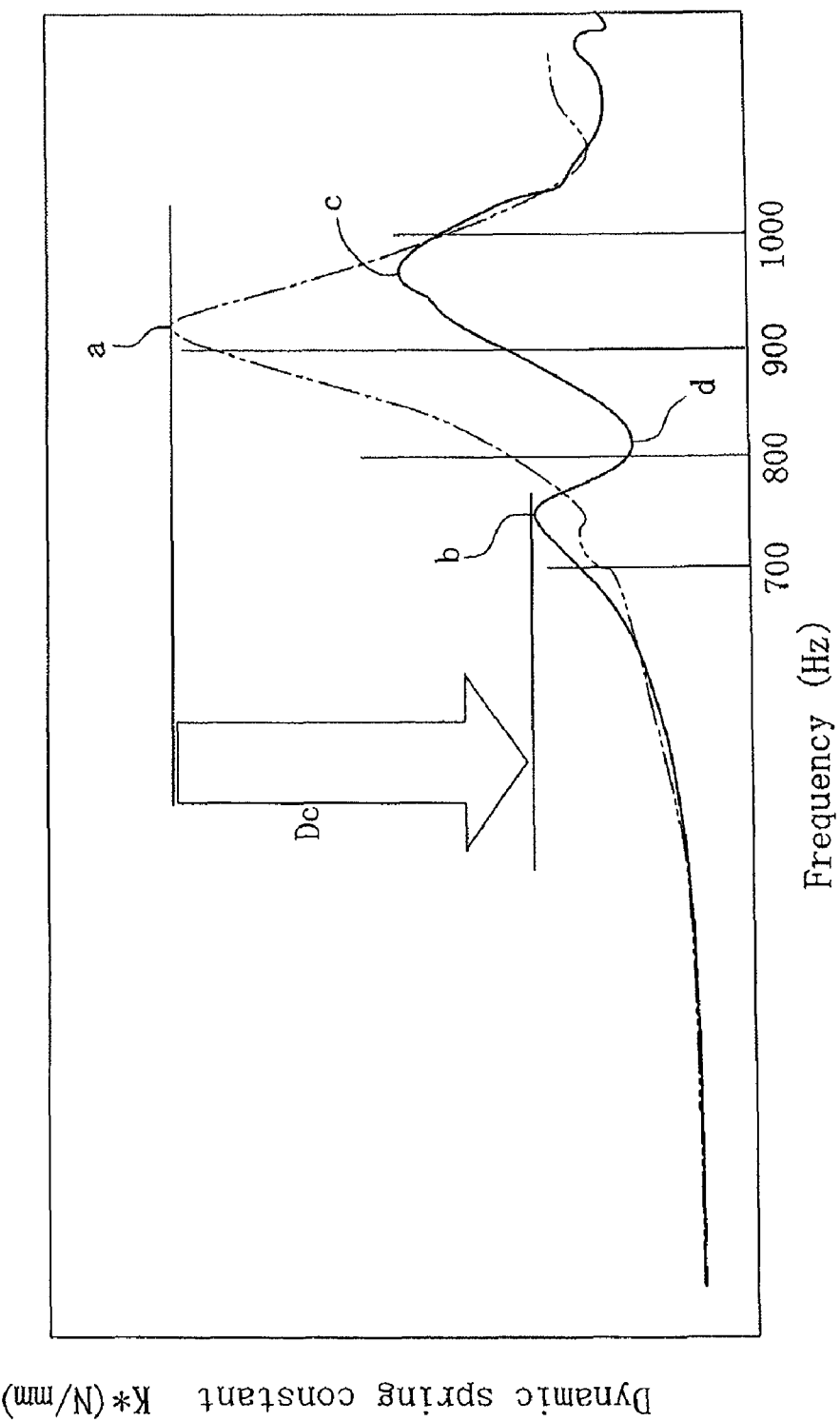
FIG. 4 is a graph showing a dynamic spring constant relative to the frequency.

FIG. 3 is an enlarged cross sectional view of the mass projection 5 taken along line 3-3 of FIG. 1, wherein the mass projection 5 has the given volume determined by the area S of the circle and the length H of the projection. This volume is set such that the mass projection 5 resonates in a frequency range of the vibration generating the surging of the elastic leg 4. Namely, while the dynamic spring constant characteristic curve of an example for reference without the mass projection shown in a phantom line in FIG. 4 reaches the dynamic spring constant peak "a" at a little higher than 900 Hz of the surging frequency, in this embodied example provided with the mass projection 5 shown in a solid line the dynamic spring constant bottom "d" of a resonance point is set in the vicinity of "a" and in the vicinity of 800 Hz of comparatively low frequency. With this structure, two dynamic spring constant peaks "b" and "c" appear such as to interpose the dynamic spring constant peak "a" of a little higher than 900 Hz of the surging frequency therebetween. Even in the dynamic spring constant peak "c" on the higher side, the dynamic spring constant decrease of width D from "a" can be accomplished so that the sufficient improvement in dynamic spring constant can be ensured. Incidentally, the dynamic spring peak frequency in the graph is shown as an example. Therefore, the setting of the dynamic spring peaks "b" and "c" can be freely performed by setting the dynamic spring bottom "d" according to the conditions or the like of the vehicle to be used.

Next, whether or not the dynamic spring constant is influenced by the change in position and in size of the mass projection 5 will be examined. At first, the examination with respect to the position will be made. There were prepared the engine mount that the mass projection 5 is provided in the upper area shown in a solid line in FIG. 1 and the one that the same mass projection 5a is provided in the lower area shown in a phantom line, and the influence on the surging was examined. Then, each of the mass projections 5 and 5a provided in the upper area and the lower area was located substantially outside of the intermediate line L7.

Figure 5:
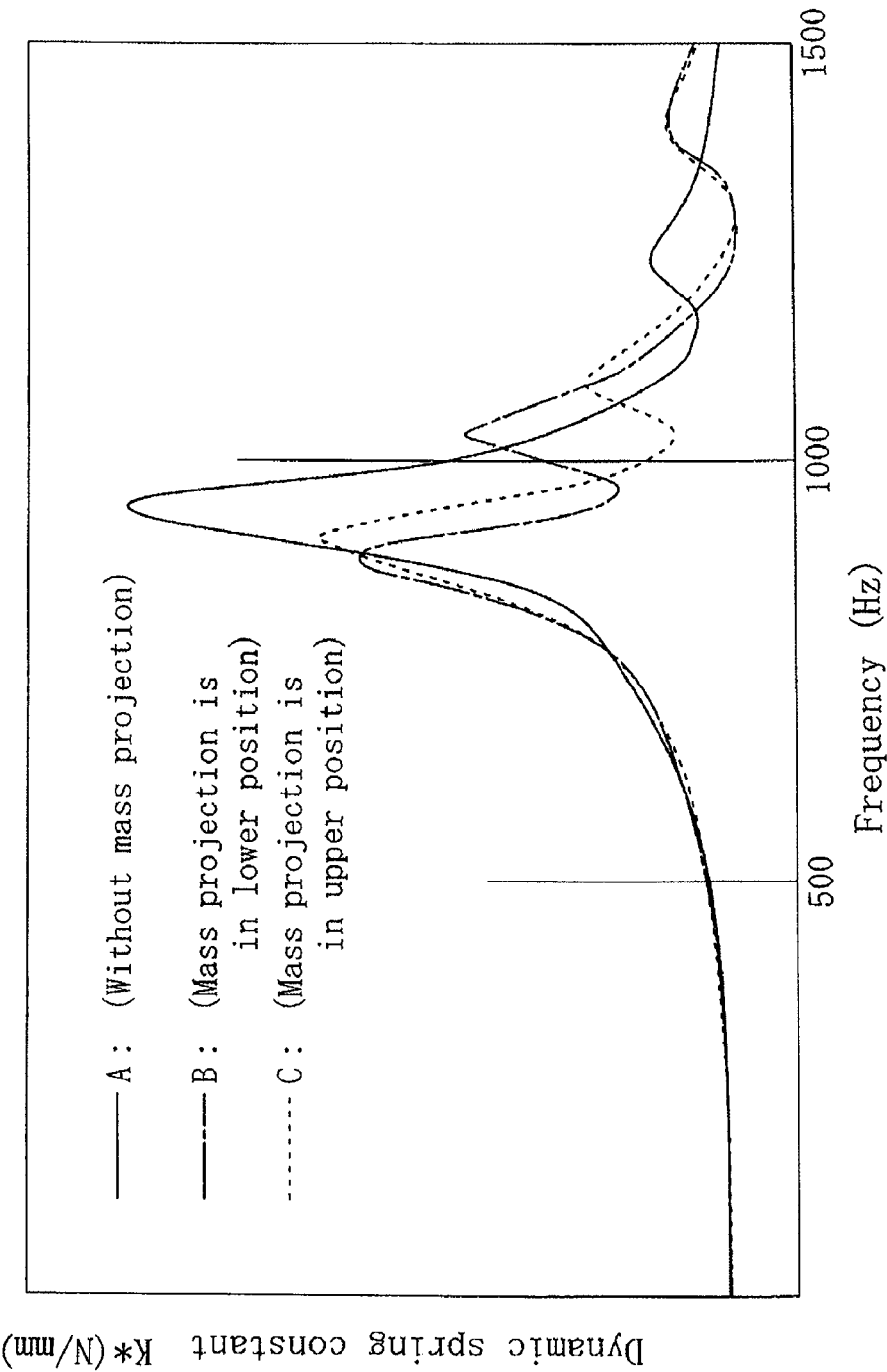
FIG. 5 is a graph for examining the influence by the arrangement of a mass projection.

FIG. 5 is a graph comparing the changes in the dynamic spring constant relative to the frequency with respect to an example "C" that the mass projection 5 is located outside of the intermediate line L7 and in the upper area of the elastic leg 4, an example "B" that it is located outside of the intermediate line and in the lower area, and a comparative example "A" having no mass projection. As apparent from this graph, both B and C can decrease the dynamic spring constant too much in comparison with the comparative example A. However, since there is only a slight difference between B and C, it can be judged that the position has no influence on the dynamic spring constant.

Figure 6:
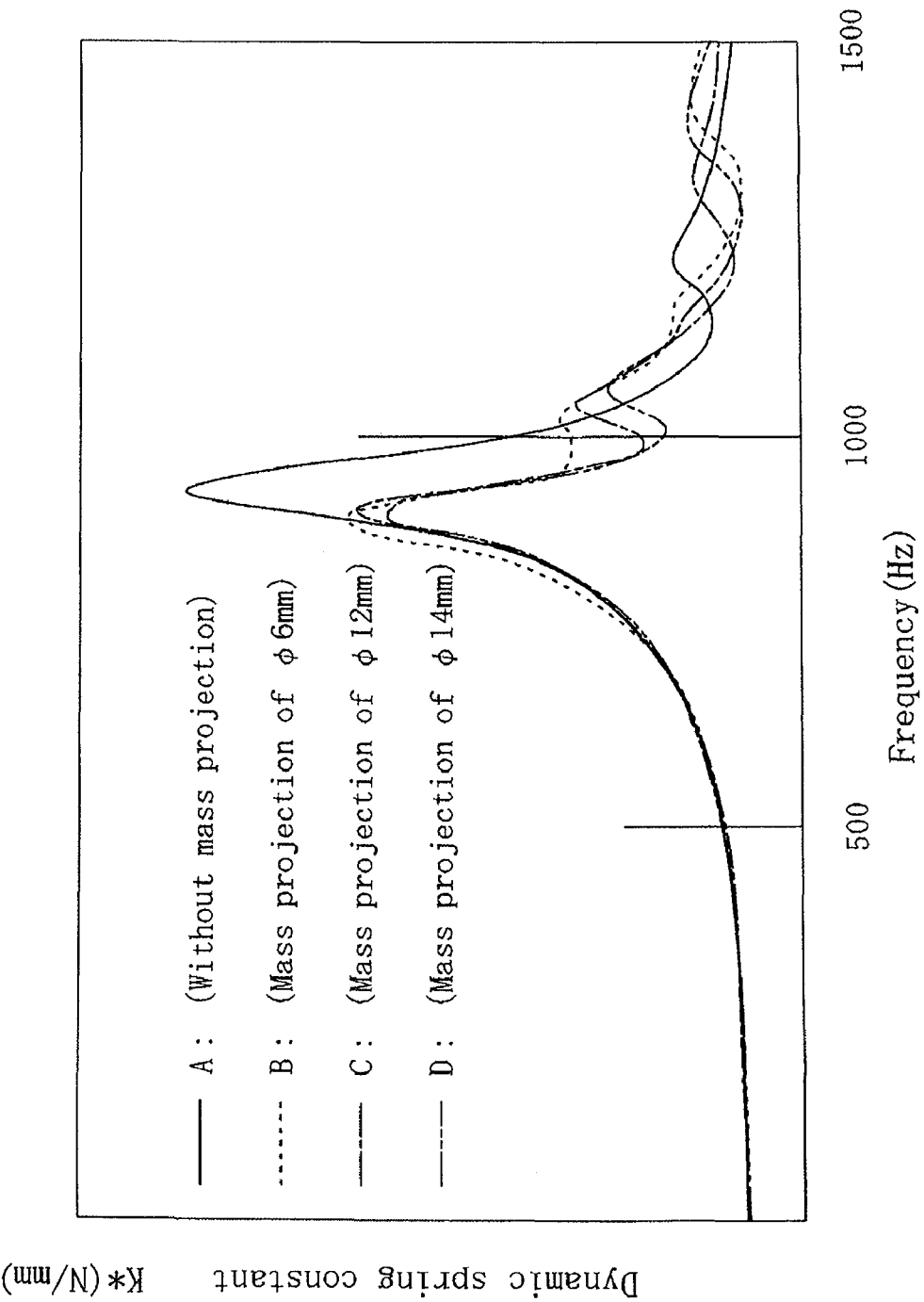
FIG. 6 is a graph for examining the influence by the size of the mass projection.

Next, there will be examined the influence in the case where the surface area ("S" in FIG. 3) is changed by changing the diameter of the mass projection 5. Herein, since the mass is to be constant, the examination of the influence by the change in diameter means that the influence by the change in the amount ("H" in FIG. 3) of projection is also examined simultaneously. FIG. 6 is a graph comparing the changes in the dynamic spring constant relative to the frequency with respect to examples that the diameter of the mass projection 5 is changed to 6φ "B", 12φ "C" and 14φ "D" and a comparative example "A" having no mass projection. As apparent from this graph, all of B, C and D can decrease in the dynamic spring constant too much in comparison with the comparative example A. However, since there is only a slight difference among B, C and D, it can be judged that the diameter (the amount of projection) has no influence on the dynamic spring constant.

Figure 7:
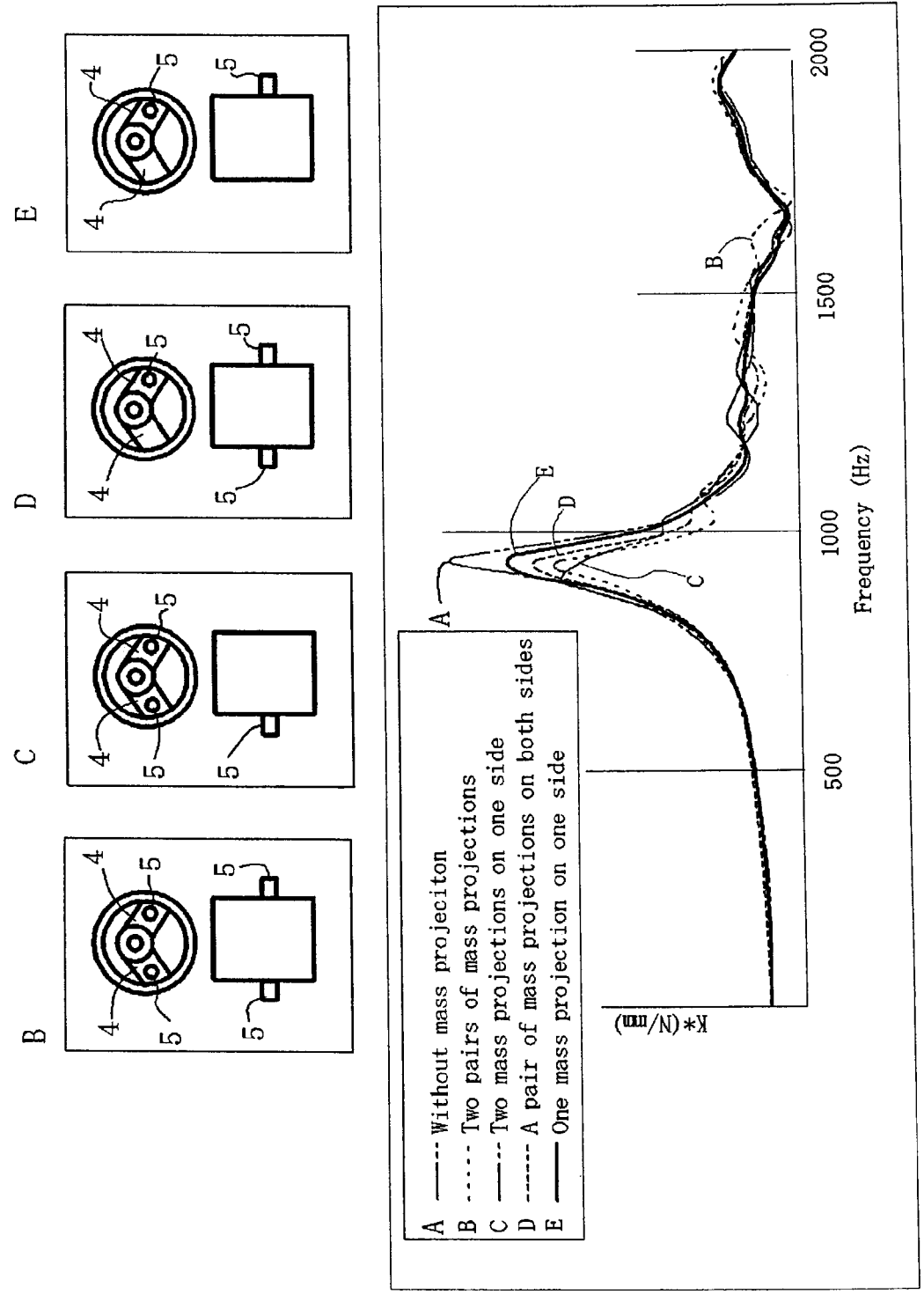
FIG. 7 is a graph for examining the influence in the case of having the mass projection arranged in an elastic leg.

FIG. 7 is a graph examining the influence in the case where the arrangement of the mass projection 5 relative to the right and left elastic legs 4 is changed. The reference character B denotes an example that two pairs of mass projections 5 are provided on both side walls of the right and left elastic legs 4. The reference character C denotes an example that two mass projections 5 are provided on one side wall (the same lateral surface) of the right and left elastic legs 4. The reference character D denotes an example that a pair of mass projections 5 is provided on both side walls of either right or left elastic leg 4. The reference character E denotes an example that one mass projection 5 is provided on one side wall of one of the elastic legs 4.

In this case, the mass projections of each of the examples are set such that they have the same shape and the same mass. The graph in this drawing is the one comparing the changes in the dynamic spring constant relative to the frequency among these B~E and a comparative example A having no mass projection. As apparent from this graph, since there is no noticeable difference among A~E, it can be judged that the mass projection 5 works well in relation to the elastic leg 4 if at least one mass projection 5 is provided on at least one elastic leg position among four position of the elastic legs 4.

From the above, since it became clear that the arrangement, number and dimensions (S and H in FIG. 3) of the mass projection 5 hardly have the influence on the improvement in the dynamic spring constant by the mass projection 5, it is possible to have the mass projection 5 arranged by adjusting the size or the like thereof in such a manner to be accommodate within the preferred arrangement region 15. Based on the above examinations, the mass projection of 6φ which is smaller in diameter than the distance "d" (see FIG. 1) is employed in this embodiment, so that it can be accommodated within the preferred arrangement region 15 without difficulty. As described above, however, this diameter can be freely set within the limit of being arranged in the preferred arrangement region 15.

Figure 8:
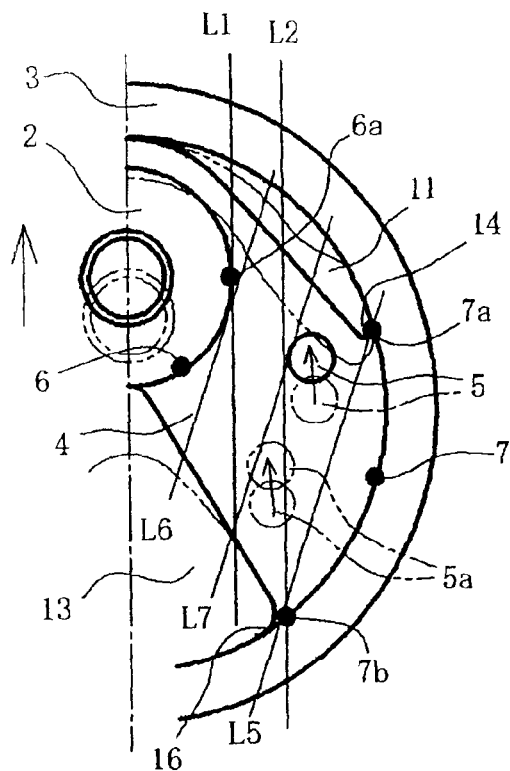
FIG. 8 is a view for explaining an operation of the embodiment.
Figure 8:
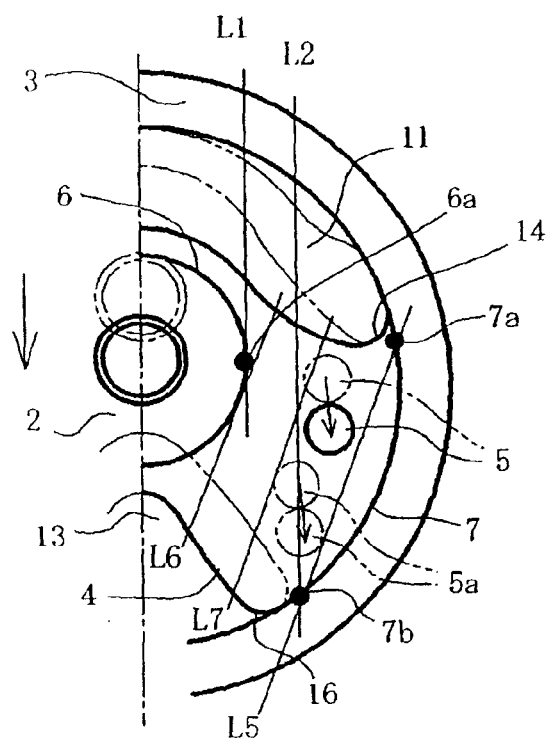

Next, the operation of this embodiment will be explained. FIG. 8 are views for explaining the vibration of the elastic leg 4, wherein the upper view shows the state that the inner cylinder 2 has moved upward and the elastic leg 4 has been pulled upwardly by the inner cylinder 2. Then, although the mass projection 5 is pulled by the inner cylinder 2 and moves from the position shown in a phantom line to the position shown in a solid line, since the center of the mass projection 5 is located outside the inner restraint line L1 and the intermediate line L7, the tensile strain caused between the inner restraint line L1 and the mass projection 5 can be decreased, and at the same time, the strain in the base portion of the mass projection 5 can be decreased. The tensile strain by pulling becomes greater with approaching the lower outer restrained portion 7b in the lower region, while the upper outer restrained portion 7a side on which the mass projection 5 is located is under compression, so that the influence of the tensile strain is lessened.

Figure 11A:
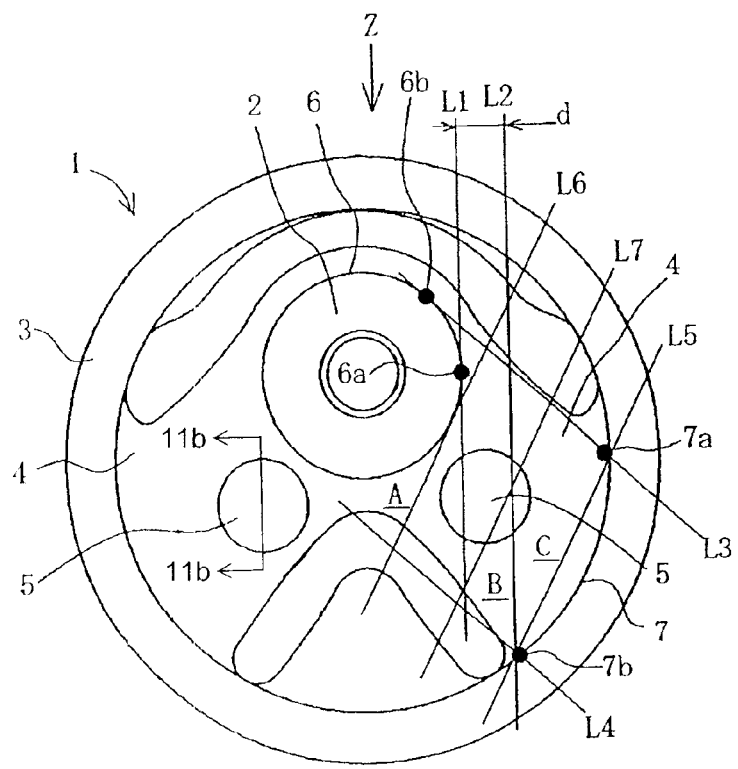
FIG. 11a is a front view of an engine mount as an example for reference.
Figure 11B:
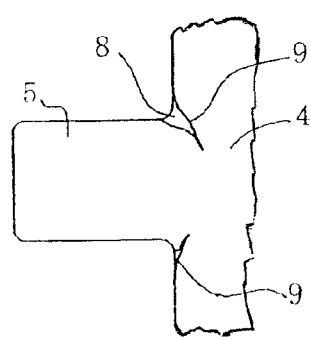
Figure 12A:
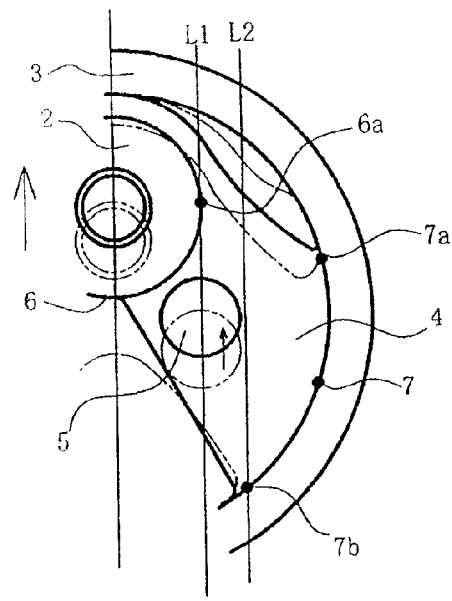
FIGS. 12a-12b are views for explaining an operation of the example for reference.
Figure 12B:
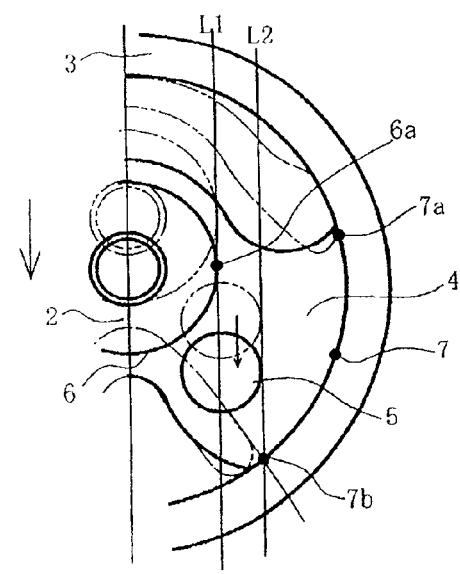

Moreover, since the neighboring region of the upper outer restrained portion 7a faces the end 14 of the upper cavity 11, the upper edge portion of the elastic leg 4 at the time of the upward movement of the inner cylinder 2 is deformed in such a manner as to be bent at the neighboring region of the upper outer restrained portion 7a, whereby the tension in relation to the outer upper region is more lessened. Therefore, the strain around the mass projection 5 is remarkably decreased in comparison with A of FIG. 11.

The lower view of FIG. 8 shows the state that the inner cylinder 2 has moved downward and the elastic leg 4 has been compressed downward by the inner cylinder 2. At this time, although the mass projection 5 moves from the position shown in a phantom line to the position shown in a solid line, the tensile strain caused between the inner restraint line L1 and the mass projection 5 can be decreased by being located outside of the inner restraint line L1 and the intermediate line L7, and at the same time, the strain in the base portion of the mass projection 5 can be decreased. The tensile strain by pulling becomes greater with approaching the upper outer restrained portion 7a in the upper region. However, the upper edge portion of the elastic leg 4 is subject merely to such a small deformation as the upper cavity 11 changes its angle to be expanded, so that the tension in relation to the mass projection 5 is lessened.

Moreover, since the center of the mass projection 5 is located outside of the intermediate line L7 and in the upper area of the elastic leg 4, the mass projection 5 can be arranged in the preferred arrangement region 15 of the least strain. Also, since the mass projection 5 is located outside of the outer parallel line L2 and in the upper area, and since the center of the mass projection 5 is located outside of the intermediate line L7, the tensile strain caused between the inner restraint line L1 and the mass projection 5 can be decreased, and at the same time, the strain in the base portion 8 (see FIG. 3) of the mass projection 5 can be decreased. The tensile strain by pulling becomes greater with approaching the lower outer restrained portion 7b, while the upper outer restrained portion 7a side on which the mass projection 5 is located is under compression, so that the influence of the tensile strain is lessened. Therefore, it is possible to have the mass projection 5 arranged in the preferred arrangement region 15 (see FIG. 9) of the least strain. In particular, by having the mass projection 5 arranged within the inscribed circle 21, the mass projection 5 is accurately arranged in the suitable position of the least strain moderately remote from each of the restraint portions. In addition, when the mass projection 5 is located in the vicinity of the upper cavity 11, the strain exerted on the periphery of the mass projection 5 can be escaped by having the elastic leg 4 deformed toward the upper cavity 11.

Then, in the case where the mass projection 5 is excited by the vibration which displaces 5.9 mm upward and 11.5 mm downward for example as the upward and downward vibration, there is caused no crack even at the order of several million frequencies which is different two figures or more from the above example for reference, so as to make it possible to obtain the noticeable improvement in durability. Accordingly, even in the engine mount having the substantially inverted V-shaped elastic leg which is subject to the decrease in durability due to the crack in the base portion 8 of the mass projection 5, it is possible to obtain the sufficient durability at the order of several million frequencies and to attain the improvement in durability to make such engine mount practicable.

Incidentally, since the strain in relation to the mass projection 5 is developed due to the tensile strain caused between the inner restraint line L1 and the mass projection 5, the arrangement outside of the inner restraint line L1 is essential and it is the most suitable for decreasing the strain to have the mass projection 5 located in the preferred arrangement region 15 outside of the intermediate line L7 and in the upper area of the elastic leg 4. Also, it is similarly suitable to have the mass projection 5 located in the preferred arrangement region 15 outside of the outer parallel line L2 and in the upper area of the elastic leg 4.

However, even in the case where the mass projection 5 is located outside of the preferred arrangement region, for example, outside of the intermediate line L7 and in the lower area of the elastic leg 4 as shown in a phantom line 5a in FIG. 1, the improvement in durability may be expected to a certain degree. On the same conditions of excitation as above, there is developed the durability at the order of several million frequencies over the generally requested level, so that it was possible to sufficiently improve the durability in comparison with the example for reference. Like this, when the mass projection 5 is arranged surely outside of the inner restraint line L1 and the center of the mass projection 5 is positioned outside of the intermediate line L7, the more sufficient improvement in durability can be expected.

FIG. 9 is a view showing the variations in preferable arrangement and size of the mass projection 5 relative to the outer parallel line L2 in the case of this embodiment in which the inner restraint line L1 and the outer parallel line L2 are spaced apart from each other and which has the shear region B. In this drawing, when the mass projection 5 is located within the preferred arrangement region 15 and particularly within the inscribed circle 21, the location is the most suitable location in durability even if the mass projection 5 is located anywhere. Then, when the outer restrained portion 7a is provided at an obtuse angle α, the inscribed circle 21 of larger diameter can be formed in the upper area. Also, if the size of the mass projection 5 is to be the level of D of comparatively small diameter, the degree of freedom in arrangement is increased remarkably. The shear deformation can be easily increased by having the mass projection 5 arranged above the horizontal tangential line L9 passing the lower limit 6c of the inner restrained portion 6. Further, when there is a requirement to increase the diameter, it can be increased up to the diameter D1 of the inscribed circle 21.

Incidentally, the mass projection 5 can be located outside of the triangle 20 or the inscribed circle 21 within the preferred arrangement region 15 outside of the outer parallel line L2. If the mass projection 5 is located within a circle 22 contacting the straight line L3 and the outer parallel line L2, it can be arranged further upward in comparison with the case arranged within the inscribed circle 21. If the arrangement of the mass projection 5 is limited to the inside of the circle 22 and the size thereof is not greater than the diameter of the circle 22, the mass projection 5 can be easily arranged in the uppermost area of the preferred arrangement region 15. Since the angle γ of the point P2 is acute, the diameter of the circle 22 becomes smaller with going upward. In addition, although the mass projection 5 is able to be located in the state of projecting out of the straight line L3, it has to be located without approaching the upper outer restrained portion 7a too much so as to avoid the rapid rise in the strain.

Similarly, when the mass projection 5 is provided within a circle 23 contacting the outer restraint line L5 and the outer parallel line L2 for example, the arrangement of the mass projection 5 in the lower area of the preferred arrangement region 15 can be easily and accurately attained. In this case, it is also required to limit the arrangement of the mass projection 5 to the inside of the circle 23 and to set the size thereof to the diameter or less of the circle 23. Since the angle β of the lower outer restrained portion 7b forming an apex is acute, the diameter of the circle 23 becomes smaller with going downward. Also, while the strain becomes greater with going downward, the distance is remote enough from the point 6a of the inner restrained portion 6 or the like so that there is no rapid rise in the strain. However, if the greater durability is required, the mass projection 5 has to be arranged in the upper area. The arrangement in the lower area can be adopted when the durability is set at the medium level requiring the lower durability. In addition, although the mass projection 5 is able to be provided in the state of projecting out of the outer restraint line L5, it has to be so located as not to cause the rapid rise in the strain since it approaches the outer restrained portion 7.

Further, the mass projection 5 can be arranged on or in the vicinity of the outer parallel line L2 on the condition that it is located outside of the inner restraint line L1. In this case, the diameter D2 of the maximum circle 24 on the outer parallel line L2 becomes 2d. Namely, the reason is that in the case of D2=2d, the maximum circle 24 contacts the inner restraint line L1. Then, if the mass projection 5 is provided within the maximum circle 24, it can be located in a position where about half of the mass projection 5 overlaps with the shear region B, so as to decrease the strain. The location of the maximum circle 24 may be freely changed upward and downward on the outer parallel line L2. However, since the maximum circle 24 approaches also the inner restrained portion 6 by the change of location thereof, it is advantageous to be provided as downward as possible. In addition, if the radius is smaller than "d", it may be located inside of the outer parallel line L2. In this case, although the diameter 2D of the maximum circle 24 is decreased whereby the degree of freedom to have the mass projection 5 arranged and the diameter of the mass projection 5 become smaller, the strain is easy to be decreased as the mass projection 5 is able to come into the shear region further.

On the contrary, the maximum circle may be arranged in an outward position of the outer parallel line L2 so as to overlap with the outer parallel line L2. With this arrangement, although the ratio of the compression and shear region C is increased, the diameter D2 can be made larger than 2d, so that the degree of freedom to have the mass projection 5 arranged and the diameter of the mass projection 5 can be increased.

Further, the mass projection 5 may be arranged within a small circle 25 which contacts the inner restraint line L1 and the outer parallel line L2. In this case, since the diameter D3 of the small circle 25 is "d", the mass projection 5 arranged inside of the minimum circle 25 does not overlap with the inner restraint line L1 and the outer parallel line L2. Therefore, although the degree of freedom to have the mass projection 5 arranged and the diameter of the mass projection 5 become smaller, the whole comes into the shear region B whereby the strain is easy to be decreased. The location of the small circle 25 may be freely changed upward and downward. However, since the small circle 25 approaches the inner restrained portion 6 as it is moved upward, it is advantageous to have it arranged in the downward position to be spaced apart from the inner restrained portion 6 as far as possible. At that time, when the small circle 25 is arranged in the lowermost position, the relaxation of the stress by being escaped into the lower cavity 13 can be expected since the small circle 25 is located in the vicinity of the lower outer restrained portion 7b and the end 16 of the lower cavity 13.

While the invention has been described in its preferred embodiment, it is to be understood that the present invention is not limited to the above described embodiment, and various modifications and applications may be made within the scope and sprit of the invention. For example, in the case where the inner restraint line L1 extends on or outside of the lower outer restrained portion 7b, there is no shear region B. but only the compression region A and the compression and shear region C are provided. In this case, with reference to the inner restraint line L1 and the intermediate line L7, the mass projection 5 may be located outside of these lines. Also, the shape of the mass projection 5 is not limited to a circle but various shapes may be adopted. When being formed in an inverted triangle, the mass projection 5 of the greatest area is easy to be provided in the preferred arrangement region 15 surrounded by the upper edge of the elastic leg 4 and the outer restrained line L5 and the outer parallel line L2. Moreover, when the mass projection 5 is formed in a horizontally extending ellipse to be provided along the upper edge of the elastic leg 4 in an inclined state, the arrangement excellent in space efficiency can be performed. Incidentally, the shapes as above are given by way of example, and various shapes such as a quadrilateral shape, a polygonal shape or the like may be properly adopted. Further, the cylindrical vibration device of the present invention is not limited to the engine mount but may be applied to various kinds of the vibration isolating devices such as a suspension bushing, etc.

What is claimed is:

1. A cylindrical vibration isolating device, comprising:
an inner cylinder defining a center point, the center point being coaxially located within the inner cylinder so as to be equally spaced from all points of a perimeter of the inner cylinder,
an outer cylinder surrounding said inner cylinder,
an elastic leg having a pair of right and left leg portions connecting said inner cylinder and said outer cylinder and, when viewed in the axial direction of the inner cylinder, forming a substantially inverted V-shape with an apex point where the left leg portion joins the right leg portion, wherein a bisecting line connects the center point of the inner cylinder and the apex point of the elastic leg,
an inner restrained portion connecting said inner cylinder and said elastic leg together,
an outer restrained portion connecting said elastic leg with said outer cylinder, and
a mass projection being provided in said elastic leg such that said mass projection resonates in a frequency range that said elastic leg causes bending resonance,
wherein said mass projection is provided radially outside of an inner restraint line, said inner restraint line passing through a radially outermost point of the inner restrained portion and being parallel to the bisecting line, and wherein said mass projection is provided entirely radially outside of an outer parallel line such that the outer parallel line is between said mass projection and said inner restraint line, said outer parallel line extending parallel to the inner restraint line and passing through a lowermost point of the outer restrained portion.

2. The cylindrical vibration isolating device according to claim 1, wherein a center of said mass projection is located outside of an intermediate line that is between an outer restraint line connecting an uppermost point and the lowermost point of the outer restrained portion and a tangential line to an outer periphery of said inner cylinder, extending parallel to said outer restraint line, and that extends parallel to each of said outer restraint line and said tangential line.

3. The cylindrical vibration isolating device according to claim 2, wherein at least half or more of a surface area of said mass projection is located outside of said intermediate line.

4. The cylindrical vibration isolating device according to claim 2, wherein said mass projection is arranged outside of said intermediate line and in an upper area of said elastic leg.

5. The cylindrical vibration isolating device according to claim 4, wherein said mass projection is provided adjacent a cavity formed between an upper edge of said elastic leg and said outer cylinder.

* * * * *